F. G. SHELDON.
Improvement in Turning Lathes.
No. 124,861.   Patented March 19, 1872.
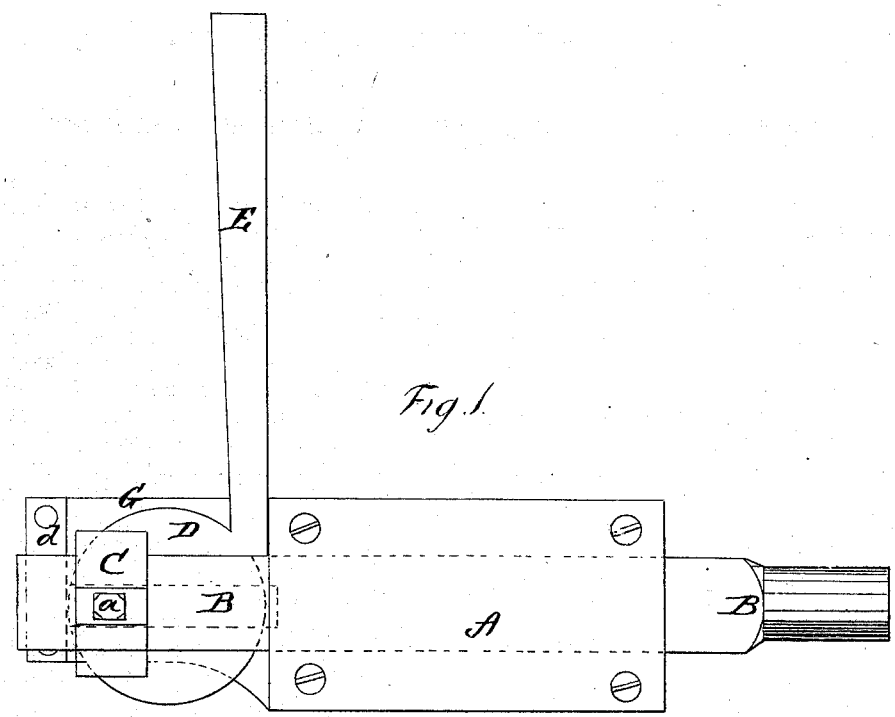
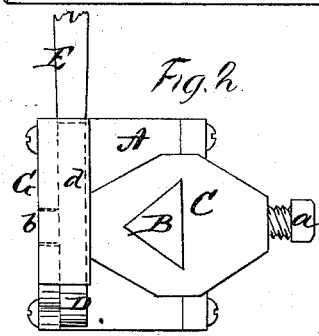

No. 124,861

UNITED STATES PATENT OFFICE.

FRANCIS G. SHELDON, OF HUDSON, MICHIGAN.

IMPROVEMENT IN TURNING-LATHES.

Specification forming part of Letters Patent No. 124,861, dated March 19, 1872.

*To all whom it may concern:*

Be it known that I, FRANCIS G. SHELDON, of Hudson, in the county of Lenawee and in the State of Michigan, have invented a certain new and useful Improvement in Turning-Lathes; and do hereby declare that the following is a full, clear, and exact description thereof, reference being had to the accompanying drawing and to the letters of reference marked thereon making a part of this specification.

The nature of my invention consists in the construction and arrangement of a device for dogging timber in turning-lathes, as will be hereinafter more fully set forth.

In order to enable others skilled in the art to which my invention appertains to make and use the same, I will now proceed to describe its construction and operation, referring to the annexed drawing, in which—

Figure 1 is a side view, and Fig. 2 is an end view of my device.

A represents the block or guide through which the dog B passes, said dog being round on its inner end; and that part which passes through the guide A is angular, so that it cannot turn by any possible means. Upon the outer angular end of the dog B is placed a collar, C, which is adjusted at any point desired and held by means of a set-screw, $a$. This collar is on its inner side provided with a pin, $b$, which passes through an eccentric, D, and into a slot on a plate, G, said plate extending from the side of the block or guide A. The eccentric D is provided with a lever, E, and is placed between the end of the block A and a flange, $d$, upon the end of the plate G.

It will readily be seen that by the use of the lever E the eccentric D will move the dog B in and out, thus enabling the operator to instantly dog and undog the timber.

Having thus fully described my invention, what I claim as new, and desire to secure by Letters Patent, is—

The combination, with the guide A and dog B, of the adjustable collar C, eccentric D, and lever E, substantially as and for the purposes herein set forth.

In testimony that I claim the foregoing I have hereunto set my hand this 17th day of July, 1871.

FRANCIS G. SHELDON.

Witnesses:
G. I. THOMPSON,
M. B. PERKINS.